April 8, 1969  MASAO YOSHINO  3,437,103

FLOW CONTROL VALVE

Filed Feb. 1, 1966

INVENTOR

MASAO YOSHINO

BY McGlew and Toren

ATTORNEYS

United States Patent Office 3,437,103
Patented Apr. 8, 1969

3,437,103
FLOW CONTROL VALVE
Masao Yoshino, 273, Numabukuro-machi,
Nakano-ku, Tokyo, Japan
Filed Feb. 1, 1966, Ser. No. 524,054
Claims priority, application Japan, Apr. 8, 1965,
40/20,323
Int. Cl. F15b 13/02; F16k 11/07
U.S. Cl. 137—100                          2 Claims

ABSTRACT OF THE DISCLOSURE

A flow control valve for controlling the flow of a hydraulic fluid between a common source and a pair of hydraulic elements. The flow is divided into two paths through a slidably positionable spool disposed within a bore through the body of the valve. Each of the flow paths communicates with one of the hydraulic elements. In response to differential pressure developed within the valve, the spool member is positionable within the bore to equalize the flow of fluid to the hydraulic elements.

---

This invention relates in general to a flow control valve, and more particularly to a flow control valve of the three way type capable of serving as a flow dividing and flow combining valve for the synchronous operation of hydraulic equipment or machinery.

Difficulties have hitherto been experienced in effecting a synchronous operation of two or more hydraulic cylinders or hydraulic motors. The use of a flow dividing valve makes it relatively easy to accomplish the object of operating hydraulic machines synchronously.

The principal object of this invention is to provide a flow control valve provided with one inlet port and two outlet ports which is capable of serving the purposes of dividing and combining the flow of fluid through said ports for the synchronous operation of hydraulic machines. If two hydraulic cylinders are operated synchronously, the reciprocating motions of the two cylinder pistons will be synchronized. The structure of the valve according to this invention makes it possible either simultaneously to divide or to combine the flow of fluid in a controlled manner in order to operate two hydraulic cylinders synchronously.

Other objects and advantages of the present invention will become apparent from the consideration of the embodiment of the invention described and shown in the accompanying drawings wherein.

Figure 1:
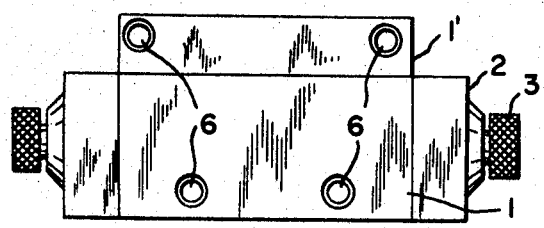
FIG. 1 is a front view of the valve according to this invention.
Figure 2:
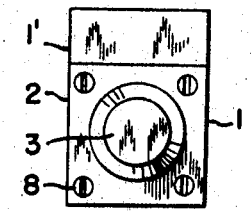
FIG. 2 is a side view of FIG. 1.
Figure 3:
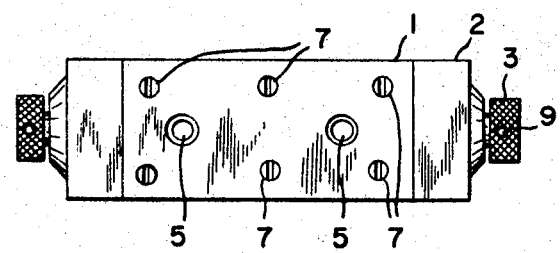
FIG. 3 is a plan view of FIG. 1.
Figure 5:
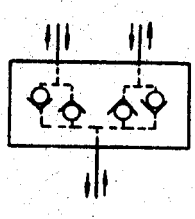
FIG. 5 is a diagram showing the directions of fluid flow.
Figure 4:
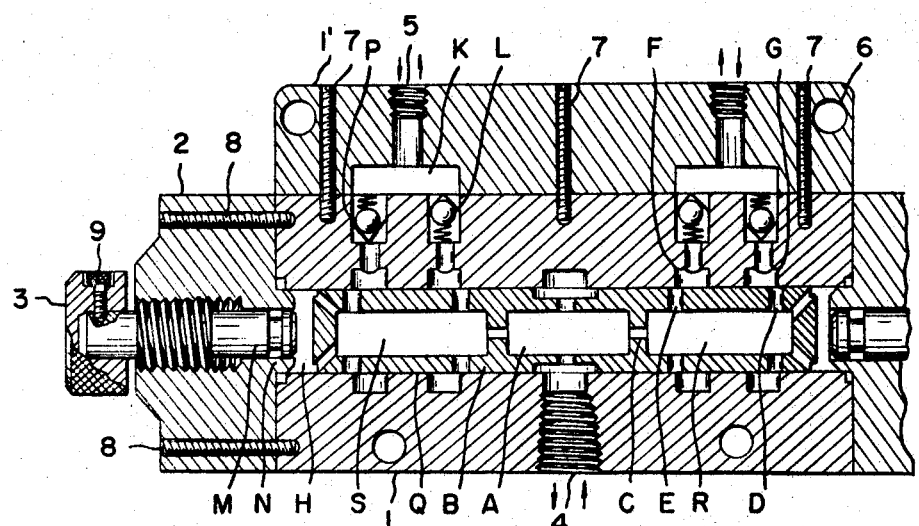
FIG. 4 is a sectional view of the valve of FIG. 1 on a larger scale.

As shown in FIG. 4, a preferred embodiment of the valve according to this invention comprises a body 1, 1' having four holes 6 for threadably receiving therein bolts for mounting the valve to a hydraulic system. A cylindrical bore Q is formed in the valve body 1, 1' for slidably mounting therein a spool B. A cap 2, on which is mounted an adjusting knob 3 provided with a locking bolt 9, is fitted over the main valve body 1 and is held in place by through bolts 8. An O-ring N provides a sealing contact between the cap and the valve body. The spool B, which is normally positioned in the center of the cylindrical bore Q and defines two end chambers H at the opposite or left and right hand ends thereof, is slidably movable in said bore and constructed such that it has in the center thereof an intermediate chamber A maintaining communication with an inlet port 4 and connected to chambers S and R through passages C. Each of the chambers R and S is connected through passages D and E to flow throttling members G and F, respectively. The throttling members G and F each communicate with one of the outlet ports 5. Each of the chambers R and S is connected through a narrow passage to one of the end chambers H. Each of the outlet ports 5 is provided with valve members P and L for blocking the upward and downward flow of fluid respectively.

The operation of the valve according to this invention will now be explained with reference to FIG. 4. When it is desired to operate two hydraulic cylinders synchronously by directing the flow of fluid upwardly to the outlet ports 5, a fluid is introduced from an external hydraulic pump (not shown) through the inlet port 4 into the intermediate chamber A in the spool B. The fluid passes through the narrow passages at the opposite ends of the intermediate chamber C and is led into the right and left hand chambers R and S, thence through passages D and E from these chambers into the flow throttling members F and G, thence through valves P, which are open, to be discharged through right and left hand outlet ports 5 for synchronously operating two hydraulic cylinders arranged in side-by-side relationship. It is to be noted that only the valve members P are opened for the fluid to pass therethrough, with valve members L being closed automatically during this operation. Each of the end chambers H is connected to the adjacent one of the chambers R and S through a small passage. The spool B, which is manufactured by precise machining operations, is symmetrical in form, so that when the spool B is in the center position, the outlet ports 5 arranged in side-by-side relationship offer the same amount of resistance to the fluid flow. If the resistance to the fluid flow offered by the outlet port 5 on the right hand side of the circuit increases, the fluid pressure in said port will also increase, so that the difference in fluid pressure between chambers A and R will be reduced, thereby causing the fluid on the right hand side of the circuit to decrease in amount. This in turn will cause the flow rate of fluid passing through the passage D to decrease, thereby increasing the fluid pressure in the end chamber H on the right hand end of the spool B. In the same manner, if the resistance to the fluid flow offered by the outlet port 5 on the left hand side of the circuit increases, the fluid pressure in the outlet port 5 will increase, so that the fluid on the left hand side of the circuit will decrease the flow rate thereof passing through the passage D communicating with the chamber S, thereby increasing the fluid pressure in end chamber H on the left hand end of the spool B. Since the spool B is caused to move back and forth in the bore Q by the difference in fluid pressure in the two end chambers H, the shifting in the direction of the spool B reduces the area of flow to one of the throttling members G to reduce the amount of fluid passing therethrough while increasing the area of flow to the other throttling member 6, with the result that the fluid pressure in one of the chambers R and S increases. This causes the spool B to halt at a position where the difference in fluid pressure between chambers A and R and the difference in fluid pressure between chambers A and S are equalized. Thus, the same amount of fluid will be directed to the two outlet ports 5 positioned in side-by-side relationship, making it possible to synchronously operate the pistons of hydraulic cylinders connected to these outlet ports.

If the operation of the valve as described in the foregoing description is reversed both in principle and practice, two outlet ports 5 will function as two inlet ports, while the inlet port 4 will function as an outlet port, with valve members L being opened and valve members P being closed, so that the valve will serve as a flow divider valve for synchronizing the reciprocating motions of pistons of hydraulic cylinders.

It will be appreciated from the foregoing description that the valve according to this invention serves as a flow divider valve which enables the control of the flow of fluid in both directions to synchronously operate hydraulic cylinders. The advantage of this valve lies in the fact that the valve serves as a flow dividing and combining valve capable of directing the flow in both directions.

What is claimed is:

1. A flow control valve being adapted to serve alternatively as a flow dividing and a flow combining valve for synchronizing the operation of hydraulic devices, comprising a valve body having a longitudinally extending bore therethrough, a longitudinally extending spool slidably positioned in surface engagement within the bore in said valve body, said spool being of a smaller length than the bore whereby when centered in the longitudinal direction the end surfaces of said spool and the adjacent end surfaces of said bore combine to form an end chamber at each end of said spool, the interior of said spool being formed to provide a longitudinally extending intermediate spool chamber spaced between a pair of longitudinally extending end spool chambers, said spool having at least one narrow opening at each of its ends extending between said end spool chambers and the adjacent end chambers within said bore, and a pair of passageways each communicating at one end with said intermediate spool chamber and at its other end with a different one of said end spool chambers, said valve body having a first passage extending therethrough located intermediate the ends of the bore and being adapted to be connected to a source of pressurized hydraulic fluid, said spool having a first passage therethrough communicating with said intermediate chamber and being arranged to register with the first passage in said valve body for flow therebetween, said valve body having two second passages extending therethrough offset in the longitudinal direction one on each side of the first passageway through said valve body and being adapted to be connected to the hydraulic devices, said valve body containing two pair of third passages extending therethrough, each of said pair of third passages connected at one end to one of said end spool chambers and at the other end to one of said second passages, flow throttling means being disposed within each of said third passages, each passage in said pair of said third passages having a flow control member disposed therein one for selectively controlling flow therethrough from said end spool chamber to said second passage and the other for selectively controlling the flow therethrough from said second passage to said end spool chamber, whereby said flow control members in said third passage are arranged for selectively permitting flow of fluid in one of the two directions between said first and second passages in said valve body and said spool member being slidably positionable through the bore in said valve body in response to a differential pressure in said end chambers in said bore equalizing the quantity of fluid flow passing through said second passages.

2. A flow control valve as set forth in claim 1, wherein each of said flow control members comprising a spring biased valve member for permitting flow of fluid through said third passage in one direction only.

References Cited
UNITED STATES PATENTS

| | | | |
|---|---|---|---|
| 2,369,505 | 2/1945 | Ward | 137—625.6 |
| 2,470,025 | 5/1949 | Fraser | 137—100 |
| 2,526,361 | 10/1950 | Johnson | 137—625.6 XR |
| 2,711,717 | 6/1958 | Stacey | 137—625.68 XR |

WILLIAM F. O'DEA, *Primary Examiner.*

WILLIAM H. WRIGHT, *Assistant Examiner.*

U.S. Cl. X.R.

137—625.68; 251—282